Oct. 1, 1940.　　　O. P. McCARTY　　　2,216,596
REGULATOR CONTROL CIRCUIT
Filed Aug. 27, 1937

Inventor:
Orin P. McCarty,
by Harry E. Dunham
His Attorney.

Patented Oct. 1, 1940

2,216,596

UNITED STATES PATENT OFFICE 2,216,596

REGULATOR CONTROL CIRCUIT

Orin P. McCarty, Pittsfield, Mass., assignor to General Electric Company, a corporation of New York Application August 27, 1937, Serial No. 161,261

12 Claims. (Cl. 171—119)

My invention relates to regulator control circuits and more particularly to improvements in time delay control circuits for automatic electrical regulators.

This is a continuation-in-part of my application, Serial No. 112,698, filed November 25, 1936, which in turn is a division of my application, Serial No. 93,046, filed July 28, 1936, and assigned to the assignee of the present application. The parent case is directed to a time delay circuit per se and the division is directed to a regulator control circuit having as an element thereof the time delay circuit of the parent case. The principal new feature of the present case is the simplified regulator time delay control circuit illustrated in Fig. 4.

It is often desirable to provide certain automatic regulators with time delay control circuits so as to prevent unnecessary operation of the regulator when the regulated quantity is subject to relatively rapid and small fluctuations. Heretofore, the time delay element has been of the motor operated type involving relatively numerous and expensive moving parts. In some cases it has been energized in accordance with the magnitude of the regulated quantity so as to produce a time delay which varies inversely with the magnitude of this quantity.

In accordance with my invention I provide a novel and simple time delay control circuit which, with the exception of standard magnetic relays or contactors, has no moving parts, is very simple and inexpensive in construction and maintains its setting indefinitely.

An object of my invention is to provide a new and improved regulator control circuit.

Another object of my invention is to provide a new and improved time delay control circuit for electrical regulators.

A further object of my invention is to provide a new combination of electrical regulator and time delay relay.

My invention will be better understood from the following description taken in connection with the accompanying drawing and its scope will be pointed out in the appended claims.

Figure 1:
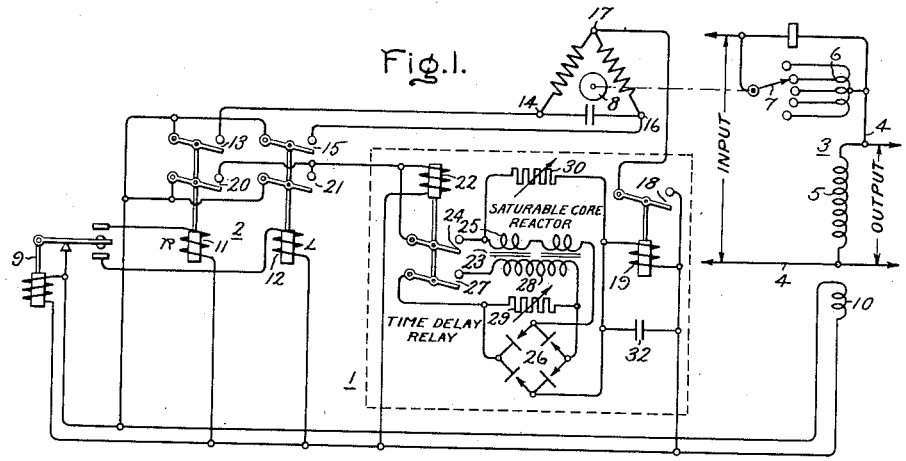
Figure 2:
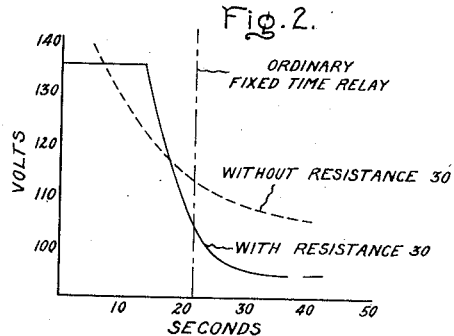
Figure 3:
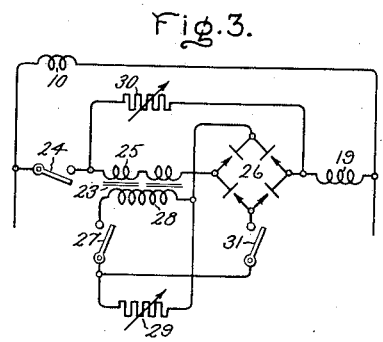
Figure 4:
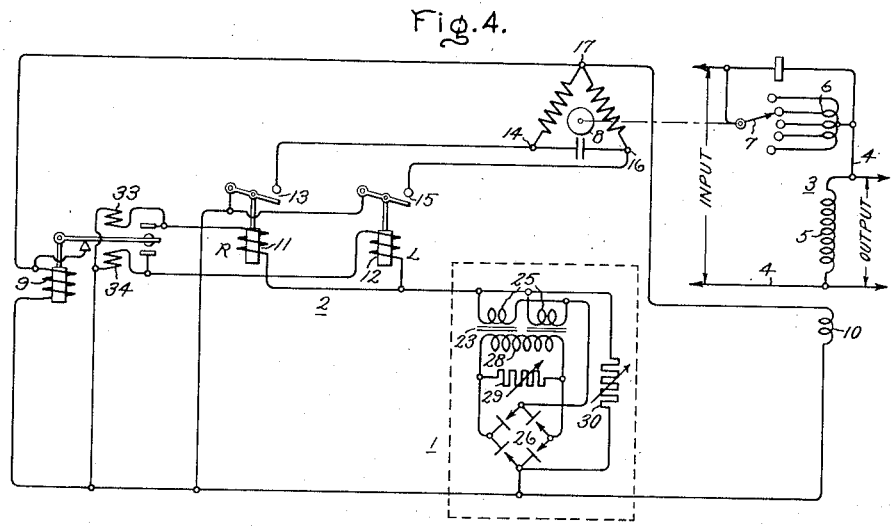

In the drawing, Fig. 1 is a diagrammatic showing of an embodiment of my invention combined with an automatic transformer tap changing step voltage regulator; Fig. 2 shows the operating characteristic of the time delay relay of Fig. 1; Fig. 3 is a modification of the time delay relay of Fig. 1, and Fig. 4 is a simplified modification of Fig. 1.

Referring now to the drawing and more particularly to Fig. 1, my time delay relay is shown in the box 1. The time delay relay is inserted in a control circuit 2 for an automatic regulator 3. The regulator 3 is a voltage regulator for an alternating current power circuit 4 and it is shown by way of example as an autotransformer having a common winding 5 and a series winding 6 provided with a tap changing switch 7 shunted by a non-linear current by-pass. The tap changing switch 7 is mechanically coupled to a reversible driving motor 8. Such regulators are well known in the art. The control circuit 2 comprises a voltage-sensitive main controller or primary relay in the form of a contact-making voltmeter 9 connected to be energized in response to the regulated voltage of the circuit 4 by means of an auxiliary winding 10 on the regulating autotransformer. Under the control of the voltage-sensitive device 9 are auxiliary "raise" and "lower" relays 11 and 12 which are connected to be energized from the auxiliary winding 10 through the contacts of the device 9. The raise relay 11 has a set of contacts 13, which, when closed by the operation of the relay, connect to a terminal 14 of the motor 8 for causing it to rotate in reverse direction and lower relay 12 has a set of contacts 15 which, when closed by the operation of relay 12, make a connection to a terminal 16 of motor 8 for causing it to rotate in a forward direction. The common, or return terminal 17 of the motor 8 has a circuit through it completed by a set of contacts 18 on a relay 19 forming part of the time delay relay. Auxiliary relays 11 and 12 also have electrically parallel contacts 20 and 21 respectively which, whenever either relay 11 or relay 12 is energized, complete a circuit for energizing a relay 22 from across the auxiliary winding 10. Relay 22 also forms a part of the time delay relay.

The time delay relay, in addition to the relays 19 and 22, includes a saturable core reactor 23 and a rectifier 26. The main circuit through the time delay relay is a series one which, starting at a pair of contacts 24 on the relay 22, includes the alternating current winding or windings 25 of the reactor, the upper input terminal of the rectifier 26, the left-hand output terminal of rectifier 26, another set of contacts 27 on the relay 22, a direct current saturating winding 28 for the reactor, the right-hand output terminal of the rectifier, the remaining input terminal of the rectifier and the operating winding of the relay 19. As shown, this circuit is arranged to be connected by means of the contacts 20 and 21 of the auxiliary relays 11 and 12 across the auxiliary winding 10 of the regulating transformer. In addition to the above elements the time delay relay is also provided with an adjustable resistance 29 which is connected across the rectifier output terminals and which is provided for the purpose of adjusting the time delay setting of the relay. There is also provided a second adjustable resistor 30 which is connected to bypass the reactor and rectifier and which serves to improve the operation of the time delay relay in a manner which will be described in connection with the operation of Fig. 1.

The parts are shown in Fig. 1 in the positions they occupy when the output voltage of the regulated power circuit 4 is normal.

The operation of Fig. 1 is as follows: If the regulated output voltage of circuit 4 departs from normal the voltage of the auxiliary winding 10 will change correspondingly thereby causing the contact-making voltmeter 9 to close its "raise" or "lower" contacts depending upon whether the voltage has decreased or increased, respectively. This will cause the proper auxiliary relay to be operated so as to make a connection enabling motor 8 to turn in the proper direction to cause the tap-changing switch 7 to move so as to vary the ratio of the regulating transformer in such a manner to restore the voltage to normal. Motor 8 cannot start, however, until the contacts 18 of the relay 19 close and these contacts will not close for a predetermined time determined by the setting of the time delay relay, provided that the contact-making voltmeter has been making contact throughout this time delay interval. Operation of either one of the auxiliary relays also serves, through the closure of either contacts 20 or contacts 21, to connect the time delay relay across the auxiliary winding 10.

The time delay relay operates in the following manner: As soon as it is connected across the winding 10 the relay 22 closes its contacts 24 and 27. This completes the series circuit through the reactor windings, the rectifier 26 and the winding of relay 19. The alternating current winding 25 of the saturable core reactor initially has a relatively high reactance as its core is unsaturated. Consequently, the current through the relay winding 19 will be insufficient to cause operation of the relay. However, the small amount of current which does flow in the circuit, while flowing through the direct current saturating winding 28, begins to saturate the core with the result that the reactance of the alternating current winding is decreased. This action is cumulative because as soon as the reactance of the alternating current winding decreases the direct current in the direct current saturating winding 28 increases thereby further decreasing the reactance of the alternating current winding and allowing the current to build up. In a predetermined time the reactor core becomes sufficiently saturated by direct current in the winding 28 so that enough current can flow through the alternating current winding 25 and relay winding 19 to cause operation of the relay.

The energizing circuit for the motor 8 will now be completed and the motor will cause the regulator to restore the voltage to normal whereupon the contact making voltmeter will again become balanced in its mid-position, the auxiliary relay will drop out thereby causing relay 22 to drop out, thereby deenergizing the time delay relay and causing the relay 19 to drop out and reset the time delay relay.

The rate at which unidirectional flux in the core of the saturable reactor builds up is determined by the adjustment of the resistor 29. The lower this resistance the more direct current through the rectifier is by-passed from the direct current saturating winding 28 and the longer it takes for the time delay relay to operate, while the higher the value of this resistance the shorter the time interval of the time delay relay.

The resistance 30 serves to permit a certain amount of current to flow through the relay winding 19 immediately upon the closure of the contacts 24 because this resistance by-passes the reactor. By properly adjusting this resistance the amount of the current flowing through it can be made insufficient to cause operation of the relay so that the reactor need only control the marginal amount of additional current necessary for causing the relay 19 to operate. In this manner less duty is required of the saturating circuit and greater time delays can be secured with a given size of reactor. Resistance 30 also causes the time delay characteristic of the relay to be such that for voltages above a predetermined value the response of the relay is substantially instantaneous while for voltages below another value the time delay is continuous and the relay 19 never closes its contacts. Both these features are very desirable. The instantaneous response on over-voltage feature is desirable because over-voltage is usually more serious than under-voltage due to the danger of destruction to apparatus, and consequently it is desirable that serious over-voltage be corrected as quickly as possible. The second feature is desirable because it takes the place of the usual low voltage release or cut-out provided in such regulating systems. In an ordinary voltage regulator when serious under-voltage occurs for any reason, such for example as a short circuit on the line, the regulating apparatus will of course try to restore the voltage to normal by running the regulator to its highest voltage position. If now the voltage is suddenly restored to normal on the supply circuit and the regulating transformer is in its maximum raise or boost position serious momentary high over-voltage may be applied to load devices thereby injuring them. To prevent this most regulators are provided with an auxiliary device known as a low-voltage release or cutout which upon the occurrence of predetermined under-voltage prevents the regulator from being run to its maximum "raise" position. However, because of the second above-mentioned feature of my time delay relay no such auxiliary low-voltage release is necessary because upon the occurrence of this under-voltage the time delay automatically becomes indefinite or continuous so that no regulating action takes place under these conditions. Upon restoration of voltage the regulator will be in the position it was in before the under-voltage occurred and thus the production of serious over-voltage on the circuit by the regulator is prevented.

In Fig. 2 the vertical dot and dash line represents the characteristics of an ordinary fixed time delay relay set for 20 seconds. With such a relay the time delay is the same for all values of voltage. The dashed curve represents the inverse time delay which would be secured by the time delay relay of Fig. 1 if it were not provided with the resistance 30. The full line characteristic is the characteristic of the time delay relay of Fig. 1. It will be apparent with the values chosen by way of illustration in Fig. 2 that for voltages above 135 volts the time delay is zero. Below 135 volts the time delay starts at about 15 seconds and increases rapidly to about 30 seconds at a voltage of about 100. For voltages below 100 the curve flattens out and becomes horizontal so that there is a continuous time delay and the relay does not operate for voltages below 100. By adjusting the value of the resistance 30 the upper and lower voltage limits of the characteristic may be changed while by adjusting the resistance 29 the steepness of the inverse characteristic portion of the curve and therefore the amount of time delay may be adjusted at will.

In Fig. 3 the time delay circuit is shown provided with an additional set of control contacts 31 interposed between the rectifier on the one hand and the direct current saturating winding 28 and the resistor 29 on the other hand. Control of the time delay circuit by the contacts 24 or 27 or 31 or various combinations of these contacts produce different operating characteristics of the time delay circuit as follows: (1) If the contacts 24 and 31 are maintained closed and the circuit is controlled by closing and opening contacts 27 there will be a definite time delay between the closing of contacts 27 and the energization of the relay winding 19 in the manner previously described. When the contacts 27 are opened the time delay relay will immediately reset and relay winding 19 will immediately be deenergized. There will be complete resetting each time the contacts 27 open so that even for the extreme case where the contacts of the contact-making voltmeter 9 chatter the contacts will have to stay closed for the full time delay period before the regulator will operate. (2) If now the control is by contacts 31 and contacts 24 and 27 are kept closed there will be the usual time delay between the closing of contacts 31 and the operating of the relay 19. However, upon opening of the contacts 31 there will be a time delay in the drop out of the relay 19. This is because of the appreciable time constant of the loop circuit containing the direct current winding 28 and the resistance 29, which maintains the flux in the core of the reactor for an appreciable period after the contacts 31 open. This keeps the impedance of the reactor low enough, for an appreciable time, so that the leakage current through the rectifier 26 plus the current through the bridging resistor 30 will hold the relay 19 closed. However, because of the presence of the loop circuit the unidirectional flux in the core of the reactor tends to build up if the contacts 31 are intermittently opened and closed so that in the case of chattering of the main control contacts the relay 19 will eventually operate. (3) When the control is by contacts 24 alone and contacts 27 and 31 remain closed there is the usual time delay upon closing of the contacts 24 and there will be instantaneous resetting and drop-out of the relay 19 upon opening of the contacts 24. However, because of the circulating path through the direct current winding 28 and the resistance 29 the flux tends to build up in the core upon intermittent operation of the contacts 24 so that excessive intermittent operation or chattering of the main control contacts will eventually cause operation of the relay 19.

In Fig. 1 it is the contacts 27 of relay 22 which give the time delay relay its time delay closing, instantaneous drop-out characteristic with no build-up of flux with chattering contact control and contacts 24 which are operated simultaneously with contacts 27 prevent the losses in the resistance 30 and relay winding 19 which otherwise would take place due to the fact that resistance 30 by-passes the reactor and thereby in effect by-passes the contacts 27.

If desired the range and sharpness of control of the time delay relay may be increased by connecting a capacitor 32 in parallel with the relay 19 as shown in Fig. 1. The capacitor is so related to the reactance of the time delay relay circuit that when the saturable core reactor is fully saturated, series resonance will occur thereby producing maximum current through the capacitor and maximum voltage drop across it. At other times when the reactor is not fully saturated, the circuit becomes dissonant and the decrease in current through it is relatively greater than the increase in impedance of the reactor.

In the modification shown in Fig. 4, substantially the same results as are secured by Fig. 1 may be secured without using the relay 19 and the contacts 20 and 21 of the raise and lower relays 11 and 12 respectively. This is accomplished by connecting the saturable time delay element in a common return conductor for the "raise" and "lower" relays 11 and 12.

Conventional holding coils 33 and 34 on the contact-making voltmeter 9 are connected respectively in parallel with the raise and lower relays 11 and 12. These holding coils consequently are energized whenever the contact-making voltmeter makes contact and tend to hold the meter in its contact-making position thereby to prevent chattering and sparking of the contacts.

The general operation of Fig. 4 is the same as Fig. 1 except that the time delay relay current passes through the contact-making voltmeter contacts and the "raise" and "lower" relays 11 and 12 have a time delayed response to the closing of the contact-making voltmeter contacts because their return circuit is through the time delay element. Thus, for example, if the voltage of circuit 4 is too low the contact-making voltmeter 9 will close a set of contacts completing a circuit through the raise relay and the time delay element in series. After a predetermined time required to saturate the core of the reactor the "raise" relay will close thereby completing a circuit through the contacts 13 to the motor which causes the motor to turn in such a direction as to cause the regulator to raise the voltage. A similar delayed action will take place in the energization of the lowering relay 12 in case the voltage circuit 4 is too high.

It will also be noted that in Fig. 4, the two sections of the alternating current winding 25 of the reactor are connected in parallel instead of in series as in Figs. 1 and 3. It has been found that both the series and parallel connections give good results.

While I have shown and described particular embodiments of my invention, it will be obvious to those skilled in the art that changes and modifications can be made in my invention without departing therefrom and I, therefore, aim in the appended claims to cover all such changes and modifications as fall within the true spirit and scope of my invention.

What I claim as new and desire to secure by Letters Patent of the United States, is:

1. In combination, an automatic regulator, a control circuit therefor, and a variable impedance electroresponsive static time delay element connected in said control circuit for causing a substantially delayed rise of current in said circuit in response to an increase in voltage applied thereto.

2. In combination, an automatic regulator, a control circuit therefor, and a static time delay element in the form of a saturable reactor having a direct current saturating winding the current in which is controlled by the impedance of the alternating current winding of said reactor which is connected in said control circuit.

3. In combination, an automatic regulator of a variable quantity, a control circuit for said regulator, a time delay relay in said control circuit, and means for causing the time delay of said relay to vary inversely with the magnitude of the regulated quantity up to a predetermined high value of said quantity above which the time delay relatively abruptly disappears.

4. In combination, an automatic regulator of a variable quantity, a control circuit for said regulator, a time delay relay in said control circuit, and means for causing the time delay of said relay to vary inversely with the magnitude of the regulated quantity down to a predetermined low value of said quantity below which the time delay is continuous whereby the regulator is prevented from raising the regulated quantity when it is below said predetermined low value.

5. In combination, an automatic regulator of a variable quantity and means for introducing a time delay in the action of said regulator which varies inversely with the magnitude of the regulated quantity between an upper limit with substantially no time delay and a lower limit with continuous time delay.

6. In an electrical regulator having a reversible motor with a forward terminal, a reverse terminal and a common terminal, a time delay relay having time delay closing contacts in series with said common terminal, a set of lower contacts for completing a connection to said forward terminal and to said relay, and a set of raise contacts for completing connections to said reverse terminal and to said relay.

7. In combination, an alternating current circuit, means for varying the voltage of said circuit, a reversible motor for operating said means, a primary relay responsive to the voltage of said circuit, means under the control of said primary relay for controlling the starting, stopping and reversing of said motor, and a static saturable reactor type time delay element connected in circuit with said means for delaying the response thereof to said primary relay.

8. In combination, an alternating current circuit, means for varying the voltage of said circuit, a reversible motor for operating said means, a primary relay connected to respond to the voltage of said circuit, separate "raise" and "lower" relays having a common return circuit connected to control the starting, stopping and reversing of said motor, said relays being connected so as to be controlled by said primary relay, a full wave rectifier having direct current output terminals and having alternating current input terminals connected in said common return conductor, and a saturable core reactor having an alternating current winding connected in series with the alternating current input terminals of said rectifier and having a direct current saturating winding connected across the direct output terminals of said rectifier.

9. In combination, an alternating current circuit, means for regulating the voltage of said circuit, a reversible motor for operating said means, a primary relay responsive to the voltage of said circuit, a pair of "raise" and "lower" relays under the control of said primary relay for making and breaking starting, stopping and reversing connections of said motor, said "raise" and "lower" relays having a common return conductor, and a static variable impedance type time delay element connected in said common return conductor.

10. In an automatic regulating system, a reversible motor for operating a regulator, a primary relay having separate "raise" and "lower" contacts, a set of auxiliary "raise" and "lower" relays having contacts for controlling directly starting, stopping and reversing connections for said motor and having windings which are connected directly to be controlled by the "raise" and "lower" contacts of said primary relay, said "raise" and "lower" relays having a common return circuit, and a common time delay element in said common return circuit for said "raise" and "lower" relays.

11. In combination, an electric circuit, an automatic voltage regulator for said circuit, a control circuit for said regulator, and a static time delay element comprising a self-saturated reactor connected in said control circuit.

12. In combination, an alternating current power circuit, an automatic voltage regulator for raising and lowering the voltage of said circuit in response to departure of the voltage of said circuit from a predetermined normal value, and means including a static time delay element for delaying the operation of said regulator in both raising and lowering directions, said time delay element containing a saturable core reactor having an alternating current winding and a direct current winding connected in series by means of a full wave rectifier.

ORIN P. McCARTY.